Figure 1:
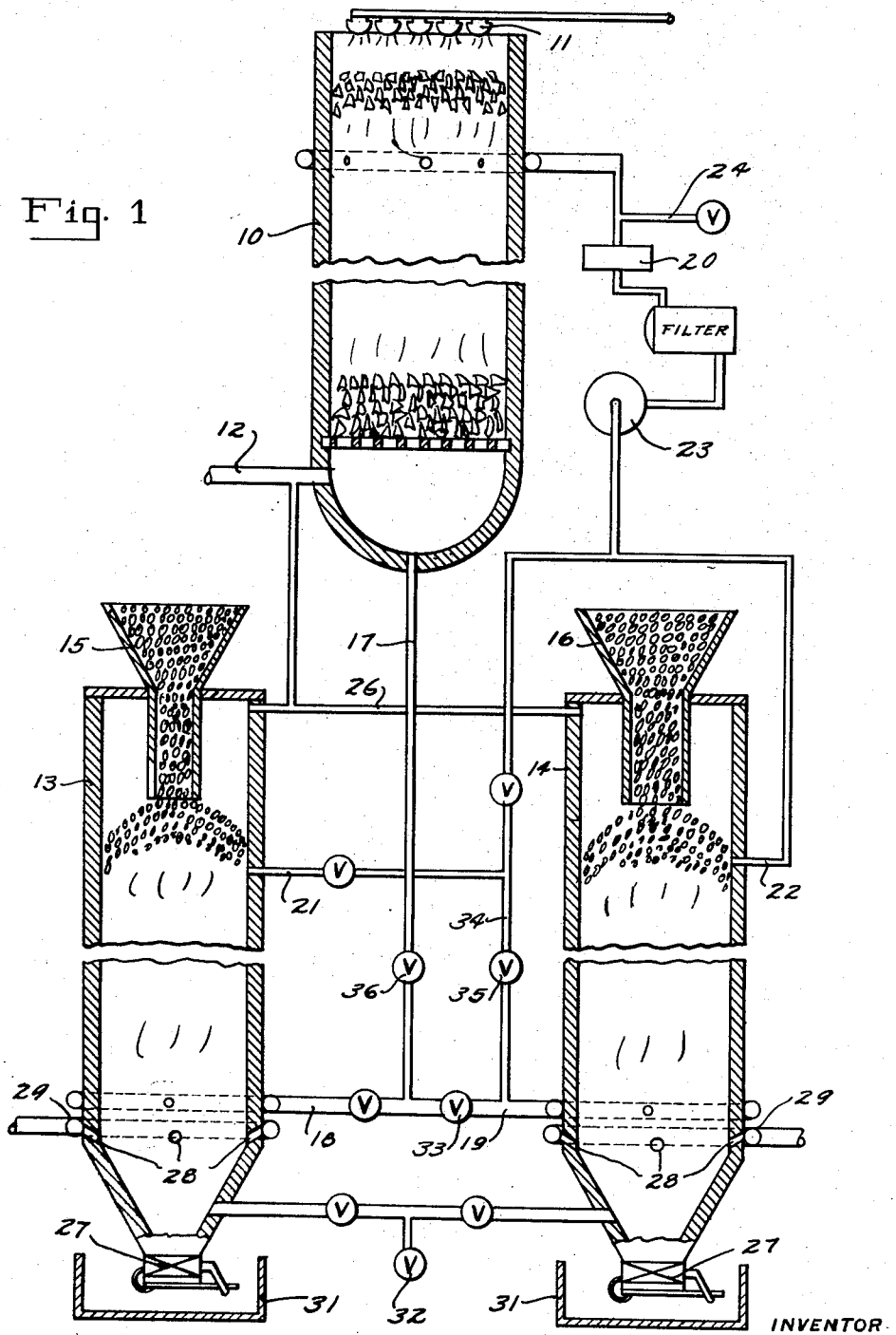

March 28, 1939. W. R. SEYFRIED 2,152,364
RECOVERING VALUES FROM PHOSPHATE ROCK
Filed March 22, 1937 2 Sheets-Sheet 2

INVENTOR
Warren R. Seyfried
BY
Johnston & Jennings
ATTORNEYS

Patented Mar. 28, 1939

2,152,364

UNITED STATES PATENT OFFICE 2,152,364

RECOVERING VALUES FROM PHOSPHATE ROCK

Warren R. Seyfried, Tampa, Fla.

Application March 22, 1937, Serial No. 132,258

8 Claims. (Cl. 23—88)

This invention relates to a process for recovering values from phosphate rock, and particularly to a process in which phosphate rock fines may be digested without the necessity of grinding or drying, or otherwise preparing the rock, and one in which a larger percentage of the fluorine content of the rock may be recovered than has heretofore been practical.

In my prior patents, Nos. 1,969,951 and 2,061,639, I have shown, described and claimed processes for producing phosphates from phosphate rock, digesting the same, either with hydrochloric acid solution formed on the rock, or with liquid hydrochloric acid passed upwardly through a bed of the rock. The method herein described is an improvement over either of the aforesaid processes, in that provision is made to prevent the escape of any gaseous fluorine compounds, and the process is so carried out that most of the fluorine in the phosphate rock may be recovered in the form of marketable fluorine compounds.

In accordance with my present invention, I contemplate the recovery of HCl contained in gases evolved from a salt cake, or similar process, and the employment of a grade of phosphate rock known as fines, through which it would be difficult, or wholly impossible, to pass such HCl containing gases.

In carrying out my process, the HCl containing gases are passed upwardly through an absorption tower packed with coke or other suitable packing material, through which water or recirculated solution from the leaching step, or both, are passed downwardly. The phosphate rock to be digested is fed continuously into a tower, or towers, which are closed at the top except for the feed opening, and the solution from the absorption tower is passed upwardly through the rock in the leaching towers. Inasmuch as the acid obtained from the absorption tower may be relatively weak, the solution from the leaching tower, or a part of it, is preferably recirculated through the absorption tower to absorb more of the HCl gases. Any volatile constituents of the leaching reaction are trapped in the top of the leaching tower and are conveyed back to the absorption tower to pass upwardly therethrough to contact and be absorbed by the aqueous solution passing downwardly through it. In this way, all of the fluorine in the rock is absorbed and prevented from escaping, whereas the carbon dioxide is allowed to escape with the other inert gases.

The solution from the leaching towers containing monocalcium phosphate, calcium chloride, and fluorine in the form of hydrofluosilicic acid, may be treated after filtering with sodium chloride, in the well known manner, to precipitate sodium fluosilicate. The insoluble residue from the towers containing calcium fluosilicate and calcium fluoride is separately digested with an acid effective to convert the calcium fluosilicate into hydrofluosilicic acid, and the calcium fluoride to hydrofluoric acid. This may conveniently be either more hydrochloric acid or sulphuric acid. The hydrofluoric acid thus formed being in the presence of silica in the undigested residue from the towers, and the digestion taking place under conditions of strong agitation, immediately reacts therewith to form hydrofluosilicic acid. The solution thus obtained, after separation from the insoluble residue, is then treated with sodium chloride to precipitate the remainder of the fluorine as sodium fluosilicate. In this manner I am enabled to recover most of the fluorine in the phosphate rock as a useful marketable compound, and to produce phosphates, particularly phosphatic fertilizer practically free of fluorine.

I generally prefer to use sulphuric acid for this extraction instead of hydrochloric acid, because the calcium sulphate which is formed is largely insoluble and its presence improves the filterability of the residue. If I use hydrochloric acid, the resulting calcium chloride is soluble and, while it leaves less residue to filter, the percentage of organic matter and other ingredients which are hard to filter is increased and thereby causes the separation to be more difficult and tedious.

In the accompanying drawings forming a part of this application, I show in

Figure 2:
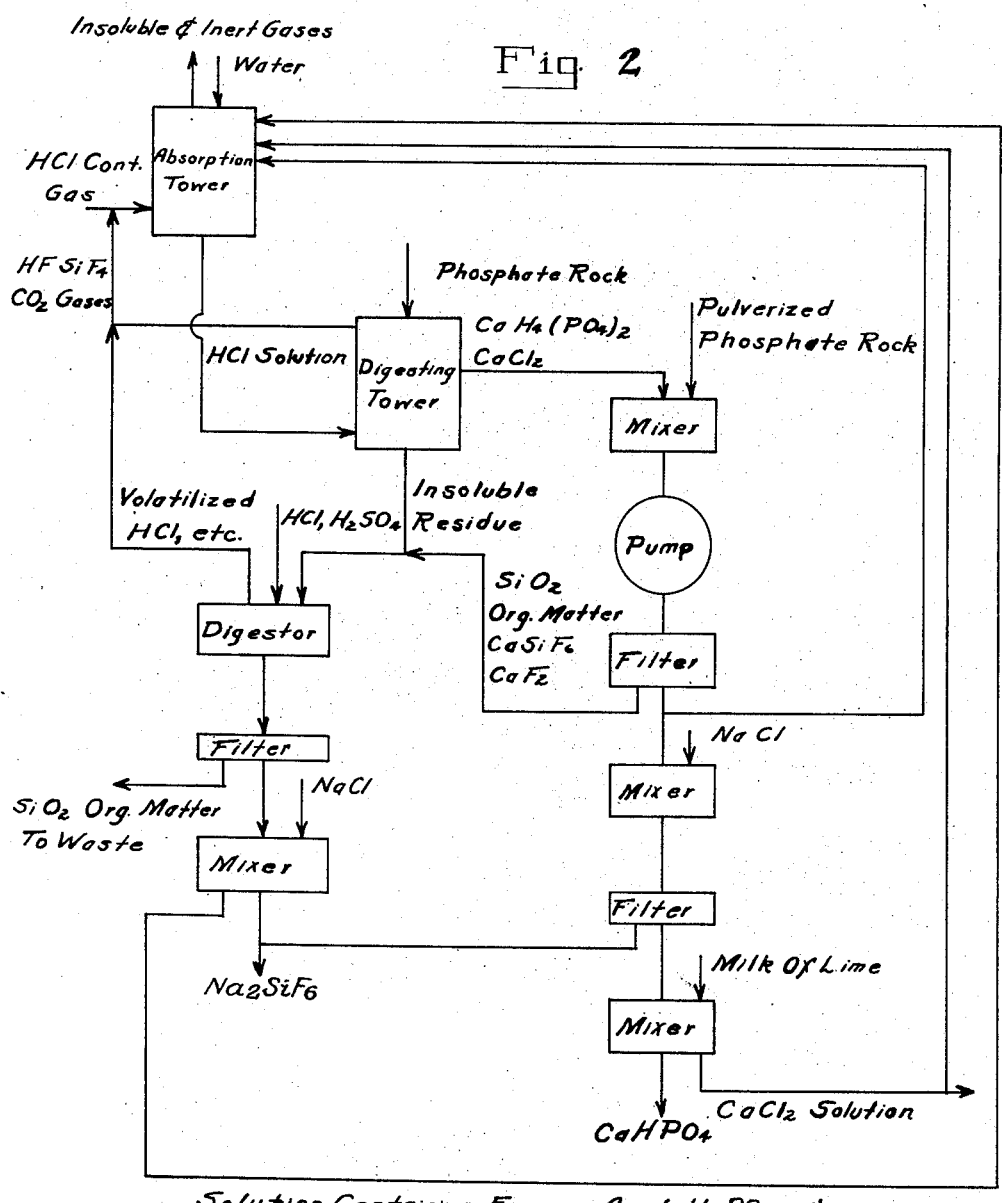

Fig. 1 a diagrammatic arrangement of apparatus particularly adapted for carrying out my invention, and in Fig. 2 I show a flow sheet setting forth the various steps in the recovery of the values in the phosphate rock.

Referring to Fig. 1 of the drawings, I show an absorption tower 10 packed with coke or other suitable material, and provided with a water spray 11. HCl containing gases enter the tower at the bottom through the conduit 12, and pass upwardly through the tower to be absorbed on the packing in the tower by the descending solutions, or by water alone. At 13 and 14 are leaching towers which are closed at the top, except for feed hoppers 15 and 16, through which phosphate rock is fed continuously so as to maintain the hoppers full of rock and prevent the escape of gases therethrough. The rock which I preferably employ, as before stated, is what is known as fines, being of a size of small gravel, or smaller.

The hydrochloric acid solution from the tower 10 passes downwardly through a conduit 17 and into the towers 13 and 14 through branch conduits 18 and 19. The acid passes upwardly through the rock in the towers, overflowing near the top through conduits 21 and 22. Preferably, a part of the solution overflowing the leaching towers is recirculated through the absorption tower after filtration, pump 23 being utilized to recirculate the solution. Since this solution is hot, and since the solubility of HCl therein is quite dependent on the temperature, the solution is passed through cooler 20 before entering the tower 10. It is also preferable to filter the solution to separate out any solids before passing into the tower 10. The remainder of the solution is taken off through a conduit 24, and may be treated, in a manner to be described later, to form phosphates and recover the other values in the rock.

The action of the hydrochloric acid on the phosphate rock releases practically all of the fluorine contained therein primarily as hydrofluoric acid, but which rapidly reacts with the silica present in all phosphate rock to form silicon tetrafluoride ($SiF_4$), some of which may not be absorbed and which would escape unless provision is made to entrap it. For this reason, the towers 13 and 14 are closed at the top and a conduit 26 leads from the space around the upper end of both towers to the absorption tower 10. The gases are passed upwardly through the absorption tower along with the HCl containing gases and the soluble constituents are there wholly absorbed by the downwardly flowing solution.

As the phosphate rock descends in the leaching towers 13 and 14, it comes into contact with stronger and stronger acid so that by the time it has reached the bottom of the tower all its soluble constituents have been dissolved out. The bottom of each tower is provided with a valve 27 which may be opened to remove the insoluble residue. Pressure nozzles 28 leading from manifolds 29 serve to wash out any residue which might not otherwise be readily removed. The insoluble residue is caught in vessels 31. It contains, besides silica and certain organic materials, calcium fluosilicate and calcium fluoride. When removing the insoluble residue from the bottom of the towers, they should first be drained of solution, and I show a conduit 32 which may be used for that purpose.

It may be found desirable to operate the leaching towers 13 and 14 in series. In order to accomplish this, a valve 33 in the conduit 19 is closed so that the solution from the tower 10 all passes through the conduit 18 and up through the tower 13. It overflows through the conduit 21 and from thence flows downwardly through a conduit 34 into the conduit 19 to enter the bottom of the tower 14. Valves 35 and 36 are manipulated to cause the solution to flow as described.

While I can introduce all the absorbing solutions into tower 10 through sprays 11, I prefer to bring them in separately, the solution from the towers 13 and 14 entering the side of tower 10 as shown. While HCl is soluble in a solution containing calcium chloride and monocalcium phosphate, such as I recirculate, or a solution of calcium chloride after the phosphate has been limed out, nevertheless it is not soluble to the same degree as in water alone. So while I take out the great bulk of the HCl with this solution, as well as the soluble constituents from the reaction towers, I admit just enough water through 11 to completely capture all the remainder and thus am enabled to maintain the solutions at greater strength and with minimum water addition as such.

Referring now to Fig. 2 of the drawings, the reactions occurring in my improved process and their order is illustrated in the flow sheet. Hydrochloric acid from the absorption tower passes through the phosphate rock in the leaching towers, as described, digesting the phosphate rock and producing monocalcium phosphate and calcium chloride in solution, which may be recirculated in part, after filtration and cooling, through the absorption tower. The rest of the solution goes first to a mixer where the proper amount of sodium chloride is added and the residual fluorine converted to sodium fluosilicate, which is quite insoluble and therefore crystallizes out. Since the hotter the solution the greater the solubility, it is generally advisable to cool the solution during or after salt addition. The solution, largely freed of its fluorine content, is, after filtration, next passed to a mixer, and lime is added to precipitate dicalcium phosphate. Other phosphates may be formed, as desired.

The fluorine in the rock will be released in the leaching tower in the form of hydrofluoric acid or silicon fluoride, both of which are gases, and both are very soluble in the solution. However, with some of the reaction taking place in the immediate top of the tower, there may not be sufficient contact of these volatile gases with water to absorb them. If not absorbed by the solution in the leaching tower, these gases pass to the absorption tower to be absorbed by the solution there, and are returned to the leaching towers, where they react with the silica present to form $H_2SiF_6$ and $CaSiF_6$. The insoluble residue from the leaching towers, containing calcium fluosilicate and calcium fluoride, is separately digested with an excess of hydrochloric acid or sulphuric acid, whereupon the fluorine compounds are converted to soluble compounds. The following equations probably occur within the reaction tower:

$$CaF_2 + 2HCl = CaCl_2 + 2HF$$
$$2HF + XH_2O = 2HF.XH_2O$$
$$4HF.XH_2O + SiO_2 = SiF_4 + 2HX_2O$$
$$SiF_4 + 2HF = H_2SiF_6$$

or $$3SiF_4 + 2H_2O = 2H_2SiF_6 + SiO_2$$
$$H_2SiF_6 + Ca.X = CaSiF_6 + H_2X$$

Calcium fluosilicate, with some calcium fluoride, is a constituent of the insoluble residue. When, after filtration, this residue is treated with an excess of HCl or $H_2SO_4$, hydrofluosilicic acid is formed, which goes back into solution.

$$CaSiF_6 + 2HCl = H_2SiF_6 + CaCl_2 \text{ (soluble)}$$

or $$CaSiF_6 + H_2SO_4 = H_2SiF_6 + CaSO_4 \text{ (insoluble)}$$

The subsequent filtering operation separates the soluble $H_2SiF_6$ and other soluble constituents from the insoluble residue. Then, with the addition of salt, sodium fluosilicate is precipitated.

$$H_2SiF_6 + 2NaCl = Na_2SiF_6 + 2HCl$$

It may be preferable to control the acidity of the effluent solution from the leaching towers so that there is a minimum of soluble fluorine compounds in the solution from the towers. This can be accomplished by maintaining a relatively low acidity, with a pH of from 2.5 to 3.5. The acidity may be regulated by the amount of water passing through the sprays 11, and by the amount of solution recirculated through the absorption tower.

A more positive means is to add a small amount of finely ground phosphate rock to the solution from the leaching towers before filtering, as shown in Fig. 2. This directly serves the purpose of reducing free acidity to the absolute minimum. If desired, filter aids, or other ingredients beneficial to the processing of the solution, may also be added at this point.

When the residue, after the addition of ground phosphate rock to the tower solution, is treated with sulphuric acid, preferably, for the recovery of the fluorine value, enough acid is also added to decompose the added rock and the resulting phosphoric acid goes into solution. The additional calcium sulphate resulting, materially benefits the filterability of the final residue from the hydrofluosilicic extraction. Finally, the solution remaining from the sodium fluosilicate precipitation containing some phosphoric acid, excess sulphuric or hydrochloric acid, etc., is introduced into the tower with the recirculated solutions and its constituents thus recovered.

From the foregoing it will be apparent that I have devised an improved process for recovering the values from phosphate rock, which is simple and economical of operation, and in which the major portion of the fluorine is recovered in the form of marketable compounds.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The process comprising passing HCl containing gases through an absorption tower employing an aqueous absorption medium, leaching phosphate rock with the HCl solution thus obtained, collecting the volatilized constituents from the leaching operation and passing said volatilized constituents through the absorption tower with the HCl containing gases to absorb the volatilized fluorine compounds therein, and utilizing in part the solution from the leaching step as the aqueous absorption medium.

2. The process of digesting phosphate rock fines utilizing HCl containing gases as the acid source which comprises passing said gases upwardly through an absorption tower employing an aqueous absorption medium, passing the acid solution thus obtained through a leaching tower containing phosphate rock, collecting volatilized gases from the rock at the top of the tower, passing said volatilized gases through the absorption tower with the HCl containing gases to absorb the volatilized fluorine compounds therein, and passing a part of the solution from the leaching tower through the absorption tower to contact the acid containing gas.

3. A method of digesting phosphate rock with hydrochloric acid utilizing as a source of acid evolved HCl containing gases, which comprises passing said gases upwardly through an absorption tower employing an aqueous absorption medium, passing the solution from said tower through a mass of phosphate rock recirculating at least a part of the resulting solution downwardly through the absorption tower to dissolve the HCl out of the gases, and passing gases volatilized by the treatment of the phosphate rock through the absorption tower to absorb volatilized fluorine compounds along with the HCl.

4. A method of digesting phosphate rock with hydrochloric acid utilizing as a source of acid evolved HCl containing gases, which comprises passing said gases upwardly through an absorption tower employing an aqueous absorption medium, passing the solution from said tower through a mass of phosphate rock, recirculating at least a part of the resulting solution downwardly through the absorption tower to aid in dissolving the HCl out of the gases, collecting volatile gases resulting from the reaction with the phosphate rock, and passing said gases upwardly through the absorption tower along with the HCl containing gases to absorb the fluorine compounds therein.

5. A method of digesting phosphate rock with hydrochloric acid utilizing as the source of said acid HCl containing gases, which comprises absorbing the HCl in an aqueous medium, passing the acid solution thus formed through a mass of phosphate rock, utilizing in part the solution thus obtained as an absorption medium for the HCl containing gases, entrapping the gases volatilized during the reaction with the phosphate rock and absorbing said volatilized gases along with the HCl in said aqueous medium, and recovering fluorine as sodium fluosilicate from the solution and from the insoluble residue resulting from the digesting of the phosphate rock.

6. A method of digesting phosphate rock with hydrochloric acid utilizing as the source of said acid HCl containing gases, which comprises absorbing the HCl in an aqueous medium, passing the weak acid thus formed through a mass of phosphate rock, utilizing in part the solution thus obtained as an absorption medium for the HCl containing gases, entrapping the gases volatilized during the reaction with the phosphate rock, absorbing the volatilized soluble gases along with the HCl in said aqueous medium, and maintaining sufficient acidity in the solution in the leaching operation to reduce to a minimum the insoluble fluorine compounds in the residue from the leading operation.

7. The process of digesting phosphate rock utilizing HCl containing gases as the acid source which comprises passing said gases upwardly through an absorption tower employing an aqueous absorption medium, passing the acid solution thus obtained through a leaching tower containing phosphate rock, collecting volatilized gases from the rock at the top of the tower, passing said volatilized gases through the absorption tower with the HCl containing gases to be absorbed therein, adding sodium chloride to the solution from the leaching tower to precipitate sodium fluosilicate, digesting the insolubles from the leaching tower with more hydrochloric acid, adding sodium chloride to the solution thus obtained to precipitate more sodium fluosilicate, and then adding lime to the solution to form calcium phosphate.

8. The process of digesting phosphate rock utilizing HCl containing gases as the acid source which comprises passing said gases upwardly through an absorption tower employing an aqueous absorption medium, passing the acid solution thus obtained through a leaching tower containing phosphate rock, collecting volatilized gases from the rock at the top of the tower, passing said volatilized gases through the absorption tower with the HCl containing gases to absorb the volatilized fluorine compounds therein, adding sodium chloride to the solution from the leaching tower to precipitate sodium fluosilicate, digesting the insolubles from the leaching tower with sulphuric acid, and adding sodium chloride to the solution thus obtained to precipitate more sodium fluosilicate.

WARREN R. SEYFRIED.